US010699727B2

(12) United States Patent
Bergmann

(10) Patent No.: US 10,699,727 B2
(45) Date of Patent: Jun. 30, 2020

(54) SIGNAL ADAPTIVE NOISE FILTER

(71) Applicant: International Business Machines Corporation, Armonk, NY (US)

(72) Inventor: Tobias U. Bergmann, Weinstadt (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 176 days.

(21) Appl. No.: 16/026,172

(22) Filed: Jul. 3, 2018

(65) Prior Publication Data

US 2020/0013425 A1 Jan. 9, 2020

(51) Int. Cl.

*H04R 3/00* (2006.01)
*H04B 15/00* (2006.01)
*G10L 21/0232* (2013.01)
*H04R 1/40* (2006.01)
*G10L 21/0216* (2013.01)

(52) U.S. Cl.

CPC .......... *G10L 21/0232* (2013.01); *H04R 1/406* (2013.01); *H04R 3/005* (2013.01); *G10L 2021/02166* (2013.01); *H04R 2410/01* (2013.01)

(58) Field of Classification Search

CPC ........ G10L 21/0232; H04R 1/46; H04R 3/005
USPC ......................................... 381/92, 94.1, 94.7
See application file for complete search history.

(56) References Cited

U.S. PATENT DOCUMENTS 5,740,256 A * 4/1998 Castello Da Costa ..................... H04B 7/015 381/94.7
6,236,731 B1 5/2001 Brennan et al.
6,717,991 B1 * 4/2004 Gustafsson ............ H04R 3/005 375/285
6,738,482 B1 * 5/2004 Jaber ...................... H04R 1/406 379/406.01
7,206,418 B2 * 4/2007 Yang ...................... H04R 3/005 381/92
7,296,045 B2 * 11/2007 Sehitoglu .............. G06F 17/142 708/400
8,351,618 B2 * 1/2013 Bai .......................... H04B 3/23 381/92
8,370,140 B2 2/2013 Vitte et al.
9,280,965 B2 * 3/2016 Buck .................. G10L 21/0208

(Continued)

FOREIGN PATENT DOCUMENTS

EP 2393463 B1 9/2016

OTHER PUBLICATIONS

Kallinger et al, "Spatial Filtering Using Directional Audio Coding Parameters", IEEE, 2009, 4 pages.

(Continued)

*Primary Examiner* — William J Deane, Jr.

(74) *Attorney, Agent, or Firm* — Cantor Colburn LLP; Teddi Maranzano

(57) ABSTRACT

Noise filtering for an incoming signal is provided. The noise filtering method includes executing a transformation operation on the incoming signal by distributing energy corresponding to each of a plurality of components of the incoming signal into a two-dimensional representation. The noise filtering method also includes executing a filtering operation on the plurality of components to determine real objects and remove noise within the incoming signal. The filtering operation utilizing at least one of a plurality of noise detection matrixes based on time, frequency, or direction.

20 Claims, 4 Drawing Sheets

(56) References Cited

U.S. PATENT DOCUMENTS

| | | | | |
|---|---|---|---|---|
| 10,176,795 | B2 * | 1/2019 | Christoph | G10K 11/178 |
| 10,410,653 | B2 * | 9/2019 | Shi | G10L 21/028 |
| 2004/0086055 | A1 * | 5/2004 | Li | H04L 1/06 375/260 |
| 2008/0112574 | A1 | 5/2008 | Brennan et al. | |
| 2010/0265170 | A1 * | 10/2010 | Norieda | G06F 3/011 345/156 |
| 2011/0158418 | A1 * | 6/2011 | Bai | H04B 3/23 381/66 |
| 2012/0115427 | A1 * | 5/2012 | Hui | H04B 7/0417 455/226.1 |
| 2013/0136271 | A1 * | 5/2013 | Buck | G10L 21/0208 381/71.11 |
| 2017/0249957 | A1 | 8/2017 | Park et al. | |
| 2017/0332172 | A1 | 11/2017 | Osako et al. | |
| 2018/0033454 | A1 | 2/2018 | Hardek | |
| 2019/0215109 | A1 * | 7/2019 | Hadani | H04B 7/005 |

OTHER PUBLICATIONS

Ma, A Novel Audio Signal De-Noising Algorithm based on the Theory of Frequency Domain Analysis and Transform Domain Model, International Journal of Future Generation Communication and Networking, 2017, pp. 71-84.

* cited by examiner

310

| Support matrix | F=1 A=0 | F=1 A=1 | F=0 A=1 | F=0 A=0 |
|---|---|---|---|---|
| T=1 | Weak signal | Strong signal | Weak noise | Weak noise |
| T=0 | Weak signal | Strong signal | Weak noise | Strong noise |

330

| Score matrix | F=1 A=0 | F=1 A=1 | F=0 A=1 | F=0 A=0 |
|---|---|---|---|---|
| T=1 | -1 | 1 | -1 | -3 |
| T=0 | 0 | 2 | 0 | -2 |

350

| Threshold matrix | F=1 A=0 | F=1 A=1 | F=0 A=1 | F=0 A=0 |
|---|---|---|---|---|
| T=1 | 1 | 1 | 1 | 0 |
| T=0 | 1 | 1 | 1 | 0 |

FIG. 3

SIGNAL ADAPTIVE NOISE FILTER

BACKGROUND

The disclosure relates generally to signal adaptive noise filters.

In general, contemporary implementations of audio noise filters filter by specified frequency band or by learning noise from a sample audio with noise only. Unfortunately, with these contemporary implementations, potential signal quality is also removed with the noise when each frequency band contains signal and noise at the same time.

SUMMARY

According to one or more embodiments, a noise filtering method for an incoming signal is provided. The noise filtering method includes executing, by a processor coupled to a memory, a transformation operation on the incoming signal by distributing energy corresponding to each of a plurality of components of the incoming signal into a two-dimensional representation. The noise filtering method also includes executing, by the processor, a filtering operation on the plurality of components to determine real objects and remove noise within the incoming signal, the filtering operation utilizing at least one of a plurality of noise detection matrixes based on time, frequency, or direction.

According to one or more embodiments, the noise filtering methods can also be implemented as a computer program product and/or a system.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

FIG. 3 depicts noise detection matrixes utilized by a system in accordance with one or more embodiments.

DETAILED DESCRIPTION

In view of the above, embodiments disclosed herein may include a system, method, and/or computer program product (herein a system) that removes, from audio signals, Fourier space audio components that are at least correlated in frequency and time to a bulk of the audio signals. Further, to execute this removal, the system can implement machine learning to separate signal and noise coefficient sets. The machine learning can be implemented by the system via supervised learning from correlation based results (e.g., using the same input) or via feature learning from noise-free signals (e.g., using a previous input).

Technical effects and benefits of the system include improving audio signals thereby improving the storage capacity of the system, improving a processing capacity of the audio signal by the system, and capacity a quality of the audio signal itself. Further, technical effects and benefits include providing a system with improved computing devices, where these improved computing devices can process audio files (comprising noisy audio signals) in an offline process to improve the audio file (i.e., the noisy audio signals) itself. Furthermore, the technical effects and benefits include providing a system with improved computing devices that execute an optimized solver for a real-time implementation (e.g., recording device filters, device stores, and playback devices can incorporate and utilize the system features to clean signals as they are received and played-back to deliver a crisper audio signal). Thus, embodiments described herein are necessarily rooted in the processors and memories of the system to perform proactive operations to overcome problems specifically arising in the realm of contemporary implementations of audio noise filters (e.g., these problems include removing potential signal quality with noise, resulting in degraded audio signals).

Figure 1:
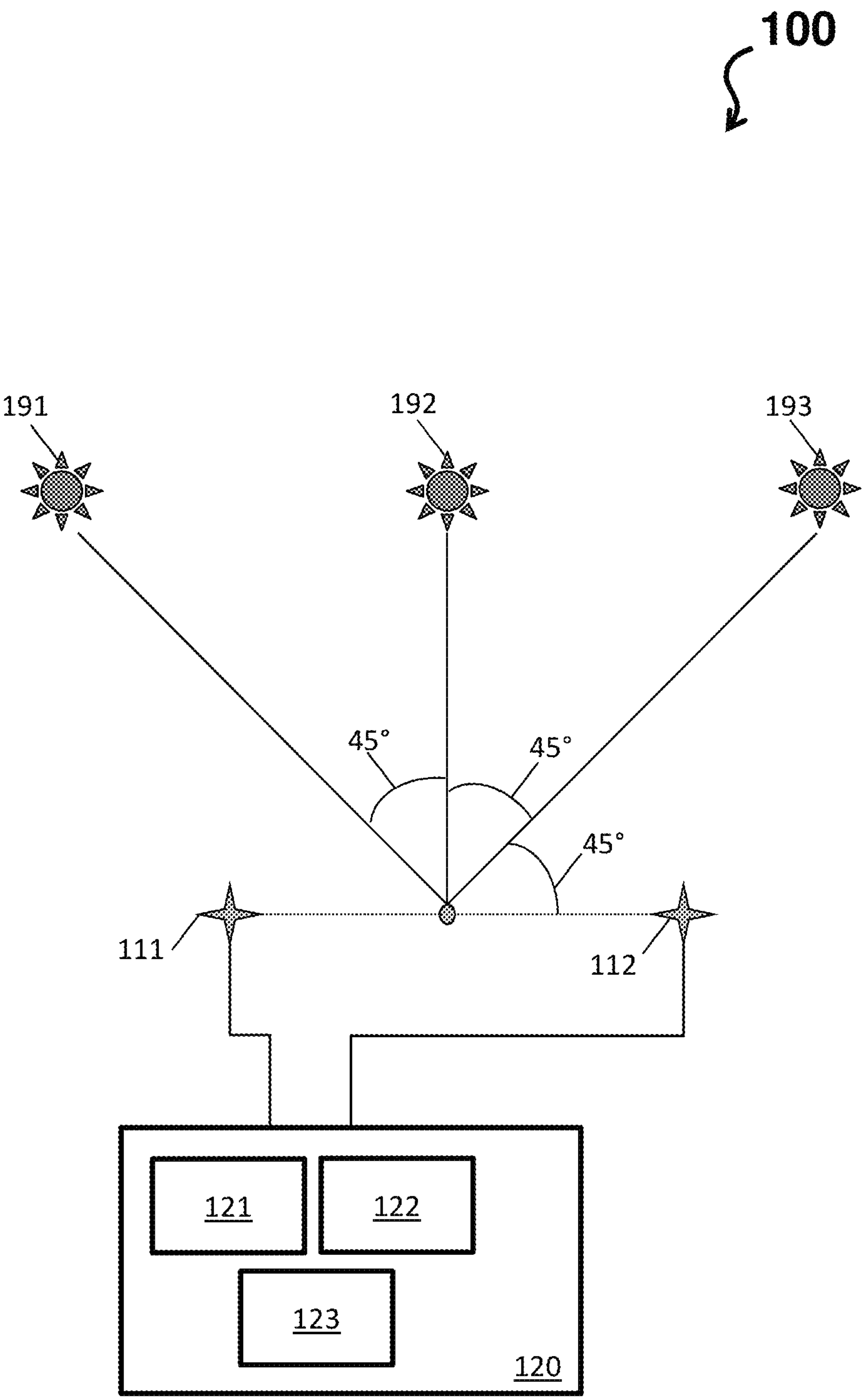
FIG. 1 depicts a system in accordance with one or more embodiments.

Turning now to FIG. 1, a system 100 is generally shown in accordance with an embodiment. The system 100 can be an electronic, computer framework comprising and/or employing any number and combination of computing device and networks utilizing various communication technologies, as described herein. The system 100 can be easily scalable, extensible, and modular, with the ability to change to different services or reconfigure some features independently of others.

The system 100 includes a plurality of microphones, e.g., a first microphone 111 and a second microphone 112, and a computing system 120. Each of the plurality of microphones can be a transducer for converting sound waves into electrical signals and for providing those electrical signals to the computing system 120. The plurality of microphones can form a microphone array, where each microphone is operating in tandem. The plurality of microphones includes, but are not limited to, omnidirectional microphones, directional microphones, or a mix of omnidirectional and directional microphones.

The computing system 120 comprises one or more central processing units (CPU(s)) (collectively or generically referred to as a processor 121). The processor 121 is coupled via a system bus to a system memory 122 and various other components. The system memory 122 can include a read only memory (ROM) and a random access memory (RAM). The ROM is coupled to the system bus and may include a basic input/output system (BIOS), which controls certain basic functions of the system 100. The RAM is read-write memory coupled to the system bus for use by the processor 121. Software for execution on the system 100, such as the noise filter algorithm described herein, may be stored in the system memory 122. The system memory 122 is an example of a tangible storage medium readable by the processor 121, where the software is stored as instructions for execution by the processor 121 to cause the system 100 to operate, such as is described herein with reference to FIGS. 2-4. Examples of computer program product and the execution of such instruction is discussed herein in more detail.

The computing system 120 comprises an input/output (I/O) adapter 123 coupled to the system bus. The I/O adapter 123 may be a small computer system interface (SCSI) adapter that communicates with the system memory 122 and/or any other similar component. The I/O adapter 123 can interconnect the system bus with a network, which may be an outside network, enabling the system 100 to communicate with other such systems.

Figure 2:
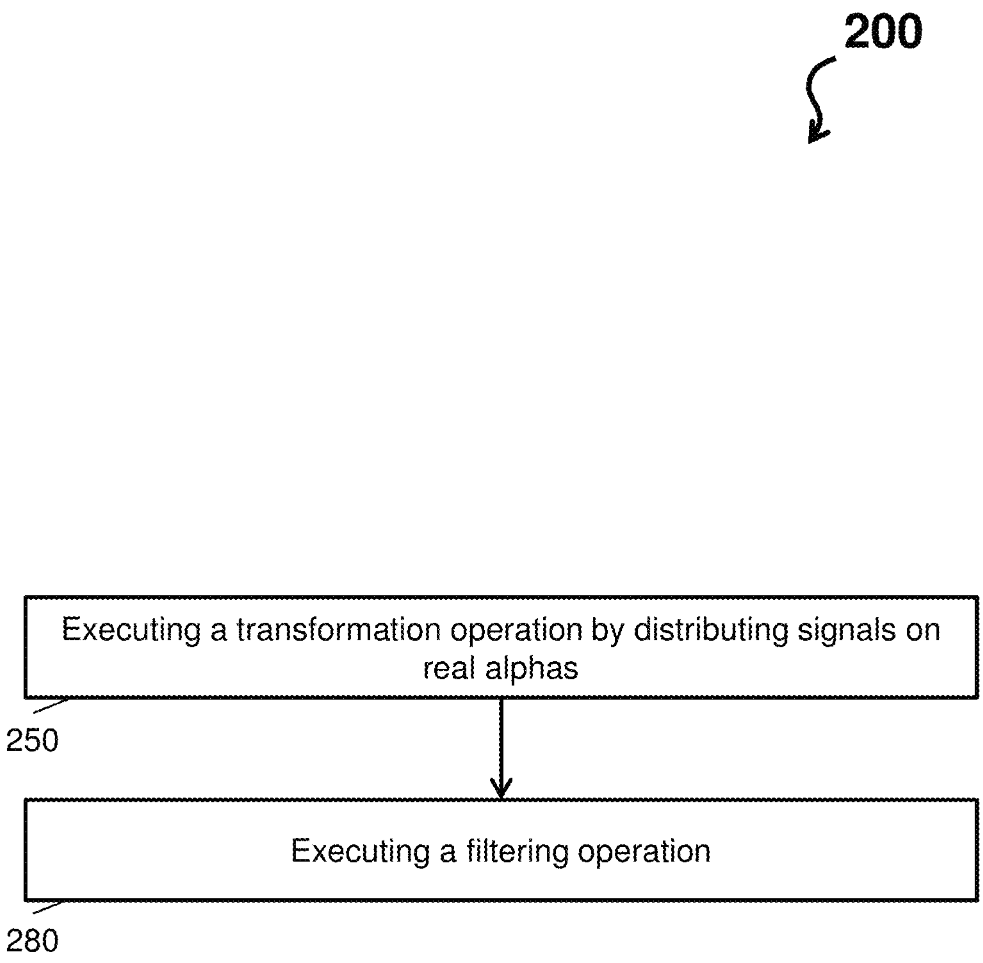
FIG. 2 depicts a process flow of a system in accordance with one or more embodiments.

Turning now to FIG. 2, a process flow 200 of the system 100 is depicted according to one or more embodiments. The process flow 200 is an example of transformation and filtering operations by the computing system 120 based on the proximity of the audio signals described herein.

For instance, the system 100 implements a noise filter algorithm (stored on the system memory 122) using direction data to remove, from audio signals generated by sources 191, 192, and 193, Fourier space audio components that are at least correlated in frequency and time to a bulk of the audio signals. In practice, multiple musicians, such as a drummer as source 191, a singer as source 192, and a guitarist as source 193, may be on stage performing a live concert. Each musician provides a corresponding audio signal, while an amplifier may provide a high pitch noise and an audience off stage may contribute crowd noise, along with other noises, which are detected by the first and second microphones 111 and 112.

Then, input data (e.g., all sound detected by the first and second microphones 111 and 112) is received by the computing system 120. The computing system 120 determines a direction of the audio signals from a relative loudness of different frequency distribution/contribution of each audio signal corresponding to each of the first and second microphones 111 and 112. The direction of the audio signals is processed and represented in a two-dimensional representation where an x-axis is a direction, a y-axis is a frequency, and each value of the two-dimensional representation is an energy. As shown at block 250 of the process flow 200, the computer system 120 executes a transformation operation by distributing signals on real alphas. Further, the computer system 120 formulate constraints and solves an equation system with minimal error.

For instance, transformation operation can compute according to the following code:

```
/*
Construct 3D directional representation from 2 Channel FFT input
Inputs:
8 time slices x 2 Channels x 512 entry FFT
36 x 5° direction amplitudes (derived from Input1)
Goals:
directional consistency: Minimize column/directional error
frequency consistency: prefer simple row decompositions => Maximize number of zero
fields / Minimize number of non-zero fields
time consistency: prefer slow changes in coefficient distribution over time (derive and
minimize "change field")
*/
param fft_in(0..7, 0..1, 0..511), real, default 0;
param alpha_in(0..35), real, default 0;
const weight := 1 0.95 0.9 0.85 0.8 0.75 0.7 0.65 0.6 0.55 0.5 0.45 0.4 0.35 0.3 0.25 0.2
0.15 0.1 0.050;
const epsilon_t := 0.3; // significant coefficient change over time
const epsilon_f := 1.4; // significant coefficient value
const goal_weight_direction := 1; // relative weight of direction_consistency
const goal_weight_frequency := 1; // relative weight of frequency_consistency
const goal_weight_time := 1; // relative weight of time_consistency
var coeff{f in 0..511, a in 0..35, t in 0..7}, real, default 0;
var column_error{a in 0..35, t in 0..7}, real, default 0; // track direction consistency
var active_field{f in 0..511, a in 0..35, tin 0..7}, real, default 0; // track
frequency_consistency
var change_field{f in 0..511, a in 0..35, t in 1..7}, real, default 0; //track
time_consistency
/* row conditions: weighted sum of all coefficients = frequency amplitude */
s.t. row_l{f in 0..511, t in 0..7}: sum{a in 0..35} coeff[f,a,t] * weight[a] = fft in[t,0,f];
s.t. row_r{f in 0..511, tin 0..7}: sum{a in 0..35} coeff[f,a,t] * weight[35-a] = fft in[t,1,f];
/* column condition: for each direction in alpha_input: column sum + error_variable =
alpha_input(direction) */
s.t. col{t in 0..7, a in 0..35}: sum {f in 0..511} coeff[f,a,t] + column_error[a,t] =
alpha_in[a];
/* frequency consistency: one point for every non-zero coefficient */
s.t. coeff_population{f in 0..511, a in 0..35, t in 0..7}:
   active_field[f,a,t] = (if abs(coeff[f,a,t])>epsilon_f then 1 else 0);
/* time consistency */
s.t. changes{f in 0..511, a in 0..35, t in 1..7}:
      change_field[f,a,t] = (if abs(coeff[f,a,t]-coeff[f,a,t-1])>epsilon_t then 1 else 0);
/* formulate all 3 goals and weigh them accordingly */
minimize error: goal_weight_direction * sum{a in 0..35, t in 0..7} abs(column error[a,t])
+ goal_weight_frequency * sum{f in 0..511, a in 0..35, t in 0..7} active_field[f,a,t] +
goal_weight_time * sum{f in 0..511, a in 0..35, t in 1..7} change_field[f,a,t];
solve;
data; // read input data from file
end;
```

With this representation, the computing system 120 executes a filtering operation based on the proximity of the audio signals. In this regard, the proximity of the audio signals can correlate to a support of signals, where if more sound is happening at the same direction then it is more likely a particular signal is sound from a real object, e.g., one of the sources 191, 192, and 193. The more likely one of the sources 191, 192, and 193 is a real object, the more favorably the computing system 120 treats the particular signal. As shown at block 280, the computer system 120 executes the filtering operation including filtering. The filtering operation uses the noise detection matrixes based on time/frequency/direction. That is, once the two-dimensional representation is produced at block 250, the computer system 120 utilizes the noise detection matrixes to determine, for each frequency component, support (e.g., to determine whether to keep components that are supported by adjacent values in time/frequency/direction).

Turning to FIG. 3, example noise detection matrixes utilized by the system 100 are depicted in accordance with one or more embodiments. These noise detection matrixes answer whether there are other signals in the same frequency range, in the same direction, and near the same time as the signals from the sources 191, 192, and 193. The noise detection matrixes include a support matrix 310, a score matrix 330, and a threshold matrix 350. Each of the support matrix 310, the score matrix 330, and the threshold matrix 350 includes value assignments for 'F,' which is frequency; for 'A,' which is angle; and for 'T,' which is time, in the header row and left most column.

The support matrix 310 can determine whether to support an audio signal as a weak signal, a strong signal, a weak noise, or a strong noise based on the time/frequency/direction. Note that the support of the audio signal can also be defined as exact, sharp, and/or un-sharp. The score matrix 330 can score the audio signal for time, frequency, and direction support. The threshold matrix 350 remove all components with a score that is less than or equal to a threshold value. For example, using '−2' as a threshold, the threshold matrix 350 identifies which audio signal to keep with a '1' and which to discard '0.' In this regard, week and strong noise in the last column is discarded.

At the conclusion, the computing system 120 collapses the filtered audio signal into a stereo signal (the system 100 removes the high pitch noise, the crowd noise, and other noises from the audio signals generated by all musicians to generate a clear and a crisp stereo signal including each musicians sound). Operations of the system 100 are now described with respect to FIGS. 2-4.

Figure 4:
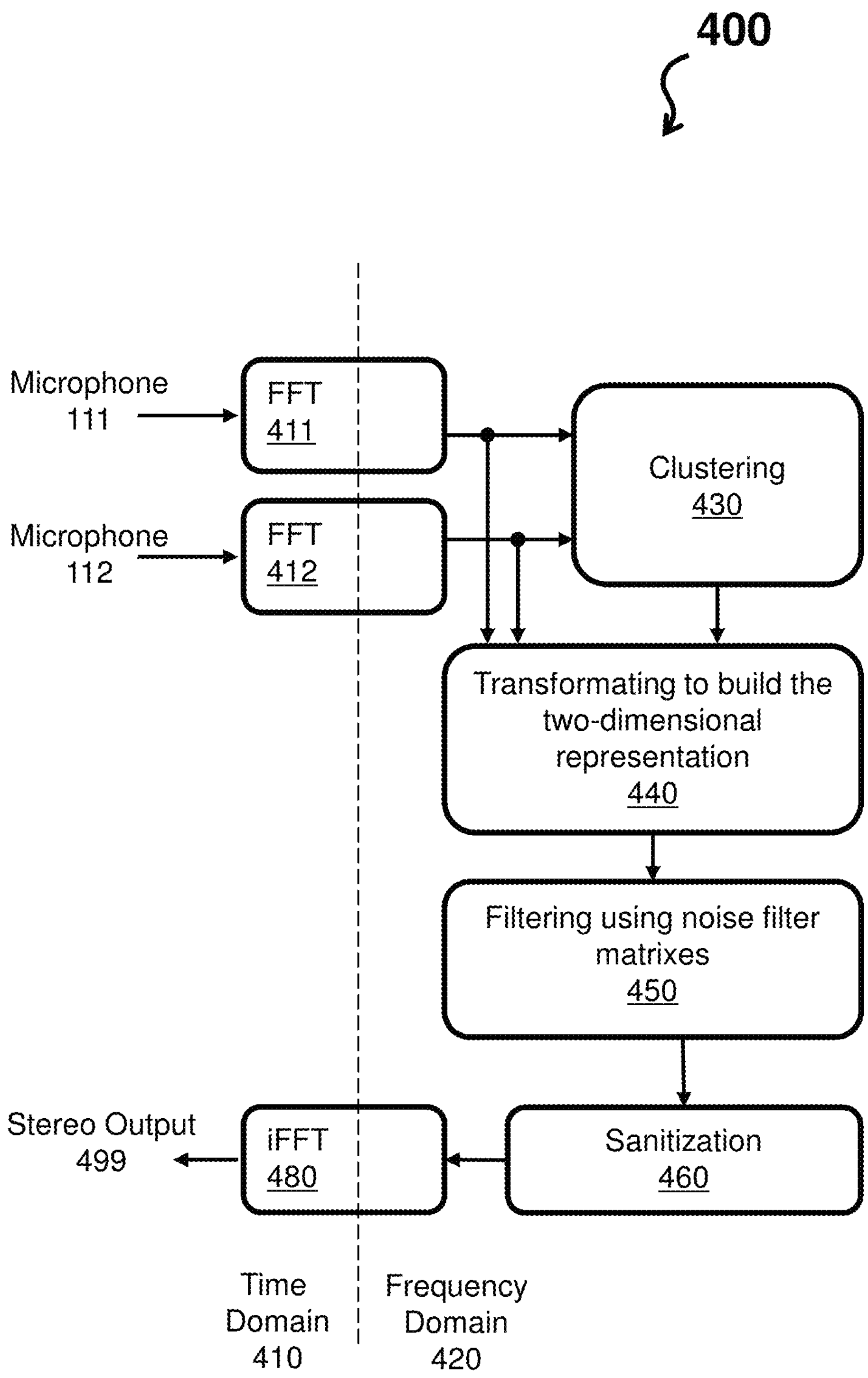
FIG. 4 depicts a schematic flow of a system in accordance with one or more embodiments.

FIG. 4 depicts a schematic flow 400 of the system 100 in accordance with one or more embodiments. As shown in the schematic flow 400, at least two channels (from the first and second microphones 111 and 112) provide input data to the computing system 120. The processor 121 of the computing system 120 accesses the noise filter algorithm stored in the system memory 122 to transform the input data from the time domain 410 (respectively via Fast Fourier Transforms (FFT) 411 and 412) to the frequency domain 420. Additionally, the processor 121 of the computing system 120 can utilize a floating window for higher precision during the time to frequency domain transformation. Further, to increase quality or parallelism: the processor 121 of the computing system 120 can use lapped FFT. Extreme case one full FFT per sample (e.g., trade-off compute effort vs. coefficient resolution); can use larger FFT window for lower frequencies (e.g., balance for same coefficient resolution over full frequency range); can use audio channels independently for increased parallelism, and can use audio channels cross correlation for improved quality.

The processor 121 of the computing system 120 can then perform a clustering 430. The clustering 430 computes which directions are dominant in the time slice, and utilizes L/R ratio and find maxima e.g., (clusters), with dominant directions (e.g., alphas).

The processor 121 of the computing system 120, thus, receives input data in the frequency domain from the FFTs 412 and 412, along with the input data from the clustering 430. This input data is transformed 440 by the processor 121 to build the two-dimensional representation.

The processor 121 then filters 450 using noise filter matrixes. In this regard, the processor 121 computes correlation matrixes between coefficients of the input data and detects and removes those coefficients that represent noise. The processor 121 executes a sanitization 460 normalizing the remaining coefficients and computes via inverse FFT (iFFT) 480 a stereo output 499 from the normalized coefficients.

In accordance with one or more embodiments, the system 100 herein can utilize machine learning to optimize compute time. For instance, the system 100 can use supervised machine learning that processes inputs, i.e., noisy audio input plus the correlation matrix and learned/supervised, to produce outputs, i.e., remaining coefficients in the noise filtered audio. Further, the system 100 can utilize pulse code modulation instead of Fast Fourier Transforms.

In accordance with one or more embodiments, the system 100 herein can utilize feature learning from noise-free audio samples. When given a noisy audio signal to a trained system, the trained system can permit learned features to pass, thus filtering out noise. Any input given to the trained system can be represented in terms of those learned features. And, since no features have been learned to model noise, it cannot be represented in the output of the trained system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A noise filtering method for an incoming signal, comprising:

executing, by a processor coupled to a memory, a transformation operation on the incoming signal by distributing energy corresponding to each of a plurality of components of the incoming signal into a two-dimensional representation; and executing, by the processor, a filtering operation on the plurality of components to determine real objects and remove noise within the incoming signal, the filtering operation utilizing at least one of a plurality of noise detection matrixes based on time, frequency, or direction.

2. The noise filtering method of claim 1, wherein the noise filtering method comprises:

receiving, by the processor coupled, input data from at least two microphones to generate the incoming signal comprising a relative loudness; and determining, by the processor, directions of plurality of components of the incoming signal based on the relative loudness.

3. The noise filtering method of claim 1, wherein each value of the two-dimensional representation represents the energy corresponding to each of a plurality of components of the incoming signal across an x-axis representing a direction and a y-axis representing a frequency.

4. The noise filtering method of claim 1, wherein the processor accesses a noise filter algorithm to transform input data from at least two microphones from a time domain to the frequency domain.

5. The noise filtering method of claim 1, wherein the noise detection matrixes comprise a support matrix, a score matrix, and a threshold matrix.

6. The noise filtering method of claim 1, wherein the processor utilizes machine learning to optimize execution time of the transformation and filtering operations.

7. The noise filtering method of claim 1, wherein the processor utilizes feature learning from noise-free audio samples to remove the noise during the filtering operation.

8. A computer program product for noise filtering of an incoming signal, the computer program product comprising a computer readable storage medium having program instructions embodied therewith, the program instructions executable by a processor to cause:

executing, by the processor coupled to a memory, a transformation operation on the incoming signal by distributing energy corresponding to each of a plurality of components of the incoming signal into a two-dimensional representation; and executing, by the processor, a filtering operation on the plurality of components to determine real objects and remove noise within the incoming signal, the filtering operation utilizing at least one of a plurality of noise detection matrixes based on time, frequency, or direction.

9. The computer program product of claim 8, wherein the program instructions are further executable by the processor to cause:

receiving, by the processor coupled, input data from at least two microphones to generate the incoming signal comprising a relative loudness; and determining, by the processor, directions of plurality of components of the incoming signal based on the relative loudness.

10. The computer program product of claim 8, wherein each value of the two-dimensional representation represents the energy corresponding to each of a plurality of components of the incoming signal across an x-axis representing a direction and a y-axis representing a frequency.

11. The computer program product of claim 8, wherein the processor accesses a noise filter algorithm to transform input data from at least two microphones from a time domain to the frequency domain.

12. The computer program product of claim 8, wherein the noise detection matrixes comprise a support matrix, a score matrix, and a threshold matrix.

13. The computer program product of claim 8, wherein the processor utilizes machine learning to optimize execution time of the transformation and filtering operations.

14. The computer program product of claim 8, wherein the processor utilizes feature learning from noise-free audio samples to remove the noise during the filtering operation.

15. A system, comprising a processor and a memory storing program instructions for noise filtering of an incoming signal thereon, the program instructions executable by the processor to cause the system to perform:

executing a transformation operation on the incoming signal by distributing energy corresponding to each of a plurality of components of the incoming signal into a two-dimensional representation; and executing a filtering operation on the plurality of components to determine real objects and remove noise within the incoming signal, the filtering operation utilizing at least one of a plurality of noise detection matrixes based on time, frequency, or direction.

16. The system of claim 15, wherein the program instructions are further executable by the processor to cause:

receiving, by the processor coupled, input data from at least two microphones to generate the incoming signal comprising a relative loudness; and determining, by the processor, directions of plurality of components of the incoming signal based on the relative loudness.

17. The system of claim 15, wherein each value of the two-dimensional representation represents the energy corresponding to each of a plurality of components of the incoming signal across an x-axis representing a direction and a y-axis representing a frequency.

18. The system of claim 15, wherein the processor accesses a noise filter algorithm to transform input data from at least two microphones from a time domain to the frequency domain.

19. The system of claim 15, wherein the noise detection matrixes comprise a support matrix, a score matrix, and a threshold matrix.

20. The system of claim 15, wherein the processor utilizes machine learning to optimize execution time of the transformation and filtering operations.

* * * * *